3,531,429
METHOD FOR PRODUCING MODIFIED RUBBERY LATICES
George F. Schmidt and Emil G. Sammak, Dover, Del., assignors to Standard Brands Chemical Industries, Inc., Dover, Del., a corporation of Delaware
No Drawing. Filed June 17, 1965, Ser. No. 464,823
Int. Cl. C08d 1/09
U.S. Cl. 260—29.7                                 5 Claims

ABSTRACT OF THE DISCLOSURE

A modified latex characterized by enhanced bonding properties for non-woven fibrous articles comprising (a) a copolymer prepared by the emulsion polymerization of a monomeric material containing at least one aliphatic conjugated diene and at least one monoolefinic monomer, and (b) up to about 20 parts per 100 parts of copolymer solids in the latex of a polyisocyanate compound having isocyanate groups which are insensitive to water.

A method for preparing the modified latex is also disclosed. This method includes the steps of mixing in an aqueous medium containing at least one emulsifier, a monomeric material comprising at least one aliphatic conjugated diene and at least one monoolefinic monomer, adding to the aqueous medium up to about 20 parts per 100 parts of monomeric material of a polyisocyanate compound having isocyanate groups that are insensitive to water, and thereafter emulsion polymerizing the monomeric material under such conditions that the polyisocyanate compound substantially does not react with the monomeric material.

---

This invention relates to modified rubbery latices or aqueous dispersions of diene polymers characterized by improved bonding properties and to the methods for making the same. More particularly, this invention relates to novel modified rubbery latices or aqueous dispersions of diene polymers containing a polyisocyanate compound having blocked isocyanate groups, and to certain methods for producing such rubbery latices. In another aspect, the invention relates to paper or other non-woven fibrous articles treated with a modified rubbery latex or an aqueous dispersion of a diene polymer containing a blocked isocyanate compound and the process for producing such paper or non-woven fibrous articles.

It has been proposed to employ both natural and synthetic latices for the impregnation or saturation of paper or other nonwoven fibrous materials in order to convert these materials into useful articles by the bonding of the fibers thereof to provide internal strength and develop other specific properties, such as improved wet and dry strength, tear strength, and the like. The impregnation or saturation operations are effected inasmuch as the papers or fibrous materials are usually of an open, highly porous, and bonded structure of webs, inherently having little or no resistance to delamination, splitting, tearing, and the like. It is apparent, however, that in many applications of papers or of bonded, non-woven fibrous materials, it is essential that the internal bond strength be highly developed in order to avoid such delamination, splitting or tearing when these materials are subjected to the stresses of normal use. In addition, the ability of the impregnated papers or fibrous materials to resist rapid rewetting, detackification, etc., when employed with pressure sensitive adhesives, and to tolerate pigmentation with retention of high internal bond strength, while exhibiting good elongation characteristics, are often necessary or desirable properties for the many end-product forms of the papers or fibrous materials.

Heretofore, various general purpose synthetic copolymer latices have been utilized as saturants for papers and other nonwoven fibrous sheeting in an attempt to increase wet and dry strength, as well as increase the internal bond strength, i.e., delamination resistance. One example of such application has been the saturation of paper backing which is employed in pressure-sensitive adhesive tapes. In practice, however, the copolymers heretofore employed have had limitations as saturants. For instance, it has been customary to saturate the sheeting with latex impregnant to achieve satisfactory wet, dry and internal bond strengths. In practice, such saturation has generally involved about 50 to 100% impregnation (expressed as percentage by weight of dry latex solids to weight of dry fiber in the sheeting). While this practice usually results in improvement of internal bond strength, it often is not satisfactory in itself and additional resins and the like are necessary to achieve the desired internal bond strength.

Accordingly, in an attempt to overcome the disadvantages of the known methods, it has been suggested that the paper or nonwoven fibrous sheeting be treated with a solution of an isocyanate resin. This was accomplished by immersion into, or by spray or roll application of the isocyanate resin solution. This treatment may be advantageous, but inasmuch as the effectiveness of the treatment depended upon the completeness of the saturation of the paper, such treatment had certain inherent disadvantages. Thus, one problem encountered with solution-treating with an isocyanate resin results from the sensitivity or instability of the isocyanate resin to water. This, therefore, necessitates the use of a substantially water-free solvent system which is a costly requirement and somewhat ineffectual inasmuch as the isocyanate groups of the treating solution are still prone to react with any water present in the system or contained in the material treated. Advantageously, it has been found that paper or nonwoven fibrous materials having desired highly improved wet and dry strength, as well as internal bond strength and thus resistance to delamination, are produced by saturating such materials with the modified rubbery latices of this invention.

This invention contemplates modified rubbery latices or aqueous dispersions of diene polymers containing certain blocked polyisocyanates therein and the methods for producing such latices. As used herein, the term "blocked polyisocyanates" refers to isocyanate compounds which have had their reactive isocyanate groups insensitized or reacted with a functional group that makes the isocyanate group stable in water, and which can later be removed to thereby "unblock" the isocyanate group. Such "blocked polyisocyanates" are preferably the reaction products of a compound containing a plurality of available isocyanate groups and a compound containing a hydroxyl group or other functional group having an active hydrogen atom. The resulting product is preferably completely blocked, i.e., all of the isocyanate groups have been reacted, but in some instances it may be only partially blocked so long as the product is substantially stable in water. Advantageously, the blocking is effected with a functional group which can be subsequently driven off with heat; thus, when desired, enabling reactivation or "unblocking" of the isocyanate groups of such products.

This invention is further concerned with the utilization of the modified latices to provide an impregnant composition for saturating papers or other non-woven fibrous materials whereby the resulting fibrous product has the desirable characteristics of resistance to rapid rewetting, as well as resistance to detackification when utilized with pressure sensitive adhesives, as well as the above-mentioned improvement in tear and wet and dry strengths. Hence utilization of blocked isocyanates with synthetic latices, in accordance with the present invention, for saturating paper materials has been found to be extraordinarily effective in improving the properties of the treated papers. For example, by use of less than 1% of a blocked isocyanate (based on the weight of solids in the rubbery latex), a latex of a butadiene/acrylonitrile bipolymer has been modified to produce paper products having increased delamination resistance and wet tensile strength without any serious expense or loss in the elongation or tear properties of the product.

In accordance with the present invention the modified latices for saturating papers or fibrous materials are prepared from monomeric materials which comprise one or more aliphatic conjugated dienes and, preferably, one or more ethylenically unsaturated monomers copolymerizable with said diene. As used herein, the term "ethylenically unsaturated monomers" includes copolymerizable monoolefinic monomers and is to be construed as excluding conjugated dienes, but may include other polyolefinic monomers.

The monomeric aliphatic conjugated dienes suitable for use include the butadiene-1,3, isoprene; 2,3-dimethylbutadiene-1,3; piperylene; 2-neopentyl butadiene-1,3; and other hydrocarbon homologs of butadiene-1,3. In addition, substituted dienes such as 2-chloro butadiene-1,3; 2-cyano butadiene-1,3; the straight chain conjugated pentadienes; straight chain and branched chain conjugated hexadienes, and the like, are also found suitable. In general, it is preferred to employ a diene having 10 carbon atoms or less, while dienes having from 4 to 6 carbon atoms have particularly advantageous reaction rates and polymerization characteristics and, consequently, are preferred. Thus, butadiene-1,3 hydrocarbons, and butadiene-1,3 itself, are particularly preferred.

In addition to the monomeric aliphatic conjagated diene, the monomer mixture to be polymerized usually also contains one or more copolymerizable monoolefinic materials. The monoolefinic monomer, which together with the aliphatic conjugated diene constitute a major portion of the polymeric material for directly preparing the impregnant compositions useful for saturating papers or fibrous materials in accordance with this invention, may be any such monomer which is copolymerizable with the diene and which is utilized in saturants for such fibrous materials. Such monoolefinic monomers are well known in the art and are indicated by typical monomers set forth below. In particular, the monoolefinic monomer is characterized as one which contains an activated carbon-to-carbon double bond, that is, a monomer containing an olefinic double bond which readily functions in an addition polymerization reaction because of the olefinic double bond being present in a monomer either in the alpha-beta position with respect to activating functional groups such as, for example, nitrile, carboxylic ester, halogen, keto, amide, and other such groups well known in the art as activating groups, or because it is adjacent to a terminal methylene group, that is

Among the monoolefinic monomers copolymerizable with the dienes in aqueous dispersion and characterized by the presence of such groups are the aliphatic unsaturated nitriles, such as acrylonitrile, alpha-chloro acrylonitrile, methacrylonitrile, ethacrylonitrile; the alcohol esters of acrylic and substituted acrylic acids, such as methyl methacrylate, butyl methacrylate, isobutyl dichloro acrylate, and other acrylic esters of alcohols, preferably those having from one to about ten carbon atoms; styrenes, such as styrene per se, halo-, cyano-, alkyl-, aryl-, and other substituted styrenes, for example, vinyl toluene, alpha methyl styrene, alpha chlorostyrene p-cyano styrene, p-phenyl styrene; other polymerizable vinyl compounds, such as vinyl naphthalene, vinyl pyridine, vinyl ethers and ketones and other compounds such as vinylidene chloride.

It is preferred to employ copolymerizable monoolefinic monomers selected from the group consisting of nitriles, styrenes, and alcohol esters of acrylic and alpha-substituted acrylic acids.

It is also advantageous to select certain ranges (expressed as percent by weight of the total monomers in the monomeric mixture) for the diene and the preferred monoolefinic monomers used to prepare the modified latices of this invention. Thus, the monomeric mixture can contain from about 20 to about 90 percent by weight of the conjagated diene and from about 10 to about 80 percent by weight of one or more of the copolymerizable monoolefinic monomers. For instance, nitriles such as acrylonitrile when copolymerized in amounts of from 10 to 60 percent by weight, preferably 15 to 45 percent by weight, with at least 40 percent by weight of the diene will provide latices capable of producing high internal bond in the impregnated fibers. With styrene and substituted styrenes, amounts of from 10 to 75 percent by weight, may advantageously be used. It is to be understood, however, that lesser quantities of any of these preferred monomers may be present, especially when more than one is utilized.

It will be appreciated that the monomer reaction mixture may also include relatively small quantities, i.e., from about 0.5 to 5% by weight based on weight of monomer mixture of a monomeric material such as acrylic and substituted acrylic acids and other copolymerizable ethylenically unsaturated monocarboxylic acids, such as crotonic acid; alpha-chlorocrotonic acid; hydrosorbic acid; cinnamic acid; m-chlorocinnamic acid; p-chlorocinnamic acid; acrylic acid; alpha-chloroacrylic acid; methacrylic acid; ethacrylic acid; vinyl thiophenic acid; alpha-furyl acrylic acid; vinyl furoic acid; p-vinylbenzoic acid; vinylnaphthoic acid; alpha -isopropenyl acrylic acid; alpha-styryl acrylic acid; sorbic acid; alpha-methyl sorbic acid; alpha-ethyl sorbic acid; alpha-chloro sorbic acid; alpha-bromo sorbic acid; beta-chloro sorbic acid; alpha-, beta-, or gamma-epsilon-dimethyl sorbic acid; 2,4-heptadienoic acid; 2,4-hexadienoic acid; 2,4-pentadienoic acid; alpha-vinyl cinnamic acid; and alpha- and beta-vinyl acrylic acids.

Generally, small amounts of the monocarboxylic acids (about 0.5%) are effective for this purpose and, advantageously, the amount need be no more than about 5% by weight of the total monomer mixture and their use in the invention is not dependent on any particular diene content or the presence of a nitrile in the copolymer.

In the practice of this invention, the blocked isocyanate compounds to be employed with the foregoing monomeric reaction materials can be prepared by a well known reaction of an isocyanate compound with a compound containing active hydrogen. In particular, it is found to be advantageous to use at least a stoichiometric amount, and if desired, a stoichiometric excess, of the active hydrogen-containing compound per mol of the polyisocyanate compound utilized. The polyisocyanate is caused to react with the active hydrogen-containing compound at an appropriate temperature. The temperature utilized, as well as the period of reaction, is dependent upon the activity of the reactants. The reaction products so obtained are usually stable at room temperature and may be handled without difficulty. As used herein, the term "polyisocyanate" includes those isocyanate compounds having two or more isocyanate groups. Thus, the isocyanate compound should contain at least two isocyanate groups and may have as many as four such groups; usually it is preferred to use diisocyanates. The diisocyanates are preferred in the practice of this invention because of their availability and ease of preparation. In general, the polyisocyanates, as well as the active hydrogen-containing compounds can be aliphatic, cycloaliphatic, or aromatic, and they may, if desired, contain other reactive groups.

Representative polyisocyanates useful in the practice of this invention include: m-phenylene diisocyanate; p-phenylene diisocyanate; hexamethylene diisocyanate; m-tolylene diisocyanate; p-tolylene diisocyanate; methylene bis (4-phenyl isocyanate); p,p'-diphenyl diisocyanate; diphenyl-3,3'-dimethyl-4,4' diisocyanate; 2-chloropropane diisocyanate-1,3; diphenyl - 3,3' - dimethoxy-4,4'-diisocyanate; 2,2'-diisocyanate diethyl ether; 3-(diethylamine)-pentyl-diisocyanate-1,5; 1,5-naphthylene diisocyanate; pentamethylene diisocyanate; tetramethylene diisocyanate; octamethylene diisocyanate; ethylene diisocyanate; propylene-1,2-diisocyanate; cyclohexylene-1,2-diisocyanate; xylylene-1,4-diisocyanate, benzene-1,2,4-triisocyanate, and the like. The diisocyanates preferred in the practice of this invention are methylene bis (4-phenyl isocyanate) (MDI) and the 2,4- and 2,6-tolylene diisocyanates (TDI) and mixtures thereof.

Representative active hydrogen-containing compounds useful in the practice of this invention include: phenol; o-, m-, and p-cresol; the xylenols; N-ethylvaleramide; N-methyl-2-naphthamide; diacetamide; acetanilide; N-phenylbenzamide; succinimide; phthalimide; malonimide; and the like. Particularly effective hydrogen-containing compounds employed in the practice of this invention include phenol and the cresol isomers.

It will be appreciated that of the primary considerations for selecting a particular hydrogen-compound are its ease of reaction and its ability to produce a blocked isocyanate group that can be subsequently unblocked.

The blocked polyisocyanate compounds can be produced in a known manner from the above-mentioned reactants. For example, methylene bis (4-phenyl isocyanate) may be blocked by reaction with phenol as represented in the following equation:

(I) 

$OCNC_6H_4CH_2C_6H_4NCO + C_6H_5OH \rightarrow$
$H_5C_6OOCHNC_6H_4CH_2C_6H_4NHCOOC_6H_5$ It will be appreciated that the above equation is for illustrative purposes only and that this invention is not to be limited to the above reactions but is applicable to all of the types of isocyanates and phenols set forth above, e.g., those having the formula $R(NCO)_n$ and $R'(OH)$ where R and R' are alkyl, aryl and alkaryl groups, and $n$ is an integer of 2 or above.

In accordance with this invention, polymerization of the aliphatic conjugated diene, the one or more ethylenically unsaturated monomers copolymerizable with said dienes and, if desired, copolymerizable ethylenically unsaturated monocarboxylic acids may be carried out with or without the addition of the blocked polyisocyanate compounds. Preferably, however, the blocked isocyanate compound is added to the recipe before or during polymerization of the diene polymers. This method of preparation is more suitable because a more stable dispersion with less settling out of the blocked polyisocyanate is obtained than where the polyisocyanate is added after polymerization. It will be understood that in either method of preparation, the blocked polyisocyanate is substantially unreacted with the diene polymers in the modified latex. Polymerization of the polymerizable compounds, with or without the blocked isocyanate compounds, is carried out in an aqueous medium; preferably by emulsion polymerization. The polymerization temperatures may range up to about 70° C. without splitting up the blocked isocyanate groups and the undesirable side reactions. While polymerization may be initiated by adding a conventional free radical-forming catalyst, such as potassium persulfate, organic hydroperoxide, and the like, it has been found that some of the preferred isocyanates such as, for example, 2,4-tolylene diisocyanate, have a tendency to inhibit the polymerization reactions at temperatures about 50° C. when such conventional free radical-forming catalysts are used. Accordingly, it has been advantageously found that a redox initiation system avoids the above undesirable inhibition of polymerization.

As used herein, the expression "redox system" covers a polymerization system in which a reducing agent is present in addition to the free radical-forming catalyst. Many examples of such systems are known. Agents such as hydrazine or a soluble sulfite, including hydrosulfites, sulfoxylates, thiosulfates, sulfites and bisulfites can be used. Examples of these are sodium hydrosulfite, sodium metabisulfite, potassium sulfite, zinc formaldehyde-sulfoxylate, and calcium bisulfite. Redox systems may be activated by the presence of a small amount of polyvalent metal ions. Ferrous ions are commonly and effectively used, particularly with chelating agents such as ethylenediaminetetraacetic acid and the like.

The amount of blocked polyisocyanate compound to be added to the monomeric mixture or to the resulting latex is somewhat critical to the present invention. In general, any addition below that amount which imparts stiffness to the so-treated non-woven fibrous material can be used to improve its internal bond strength. Usually, however, at least about 0.05 part of blocked polyisocyanates per 100 parts of polymer solids in the rubbery latex are necessary to effect a noticeable improvement in physical properties, i.e., internal bond, tear strength, wet and dry strength, and the like. On the other hand, if more than about 20 parts of the blocked polyisocyanate compound per 100 parts of the polymer solids in the rubbery latex, elongation and tear properties of the treated fibrous material are adversely affected. The operable range, therefore, is between about 0.05 and 20 parts of the blocked polyisocyanate per 100 parts of polymer solids in the rubbery latex; with from 0.1 to 5 parts of the blocked polyisocyanate per 100 parts polymer solids being preferred. Mixtures of two or more blocked polyisocyanate compounds having a total concentration within the above stated limits may be used if desired.

In some cases it may be desired to incorporate additional ingredients into the impregnating or saturating compositions of this invention. For example, the use of a dispersing agent may be desirable if it is found that a particular polymer-blocked polyisocyanate mixture tends to separate into two layers after standing. Various commercially available dispersing agents have been found to be satisfactory. Non-limiting examples of these include Daxad 11, Tamol SN, Tamol 731, Tamol 850, and the like. The blocked isocyanate may be added as an aqueous dispersion, with or without the above dispersing agents, or in a solution of acrylonitrile, tributylphosphate, and the like.

In accordance with the invention, it has been found that the dispersibility of the blocked polyisocyanate and consequently the stability of the impregnating composition depends upon the mode of addition of the blocked polyisocyanates to the polymerizable monomers serving as starting materials.

Advantageously, it has been found that addition of the blocked polyisocyanate compound to the monomeric mixture before polymerization provides an impregnating composition in which the blocked isocyanate compound remains dispersed for prolonged periods. Also addition of the blocked polyisocyanate compound in the form of a dispersion, e.g., an aqueous dispersion containing about 40% solids or the like may reduce subsequent settling from the resulting modified latex.

As stated above, one of the outstanding advantages obtained in the unification of non-woven fibrous articles with the modified diene copolymer latices is the unusually high internal bond developed. For instance, paper saturated with such copolymers at about 50 to about 100 percent saturation (or pickup) level exhibited internal bond strength, measured by resistance to delamination, as high as about 60 percent greater than those obtained with copolymer saturants used without the addition of blocked polyisocyanates. In practical application, one advantage of the invention is the ability to use a lower degree of saturation of the fibers, for example 50 percent pickup, while still obtaining internal bond strength comparable to those obtainable with high total saturation, that is 95 to 100 percent pickup, with saturants containing no blocked polyisocyanates.

In addition to the above advantages, the modified latices employed in this invention permit the retention of other properties with the high internal bond strength which are not maintained with the ordinary synthetic latices when used as saturants. Among those which have not heretofore been mentioned are the retention of high internal bond strength with pigmentation, high elongation with retention of internal bond strength and wet tensile strength and the like, depending on the modified latex employed as an impregnating or saturating composition.

The fibrous masses treated in accordance with this invention obtain suitable pickup by impregnation, such as dip saturation of preformed webs or sheets or by beater addition of an aqueous dispersion of the latex directly to the fibers prior to formation of any web or sheeting. In these processes, a mixture of polymer solids and blocked polyisocyanate compound is deposited from an aqueous dispersion onto the fibers and within the interstices of the open porous web or sheeting. To provide a finished, internally bonded saturated web or sheeting, the material is freed of excess impregnant usually by passing through squeeze rolls or the like, and it is then subjected to a drying operation.

In general, the polymer-blocked polyisocyanate content on a dry solids basis may be from about 30 percent to about 60 percent by weight of the dry unified web or sheeting. For a particular mixture of rubber polymer and blocked polyisocyanate, the internal bond strength varies with the pickup. This corresponds approximately to 40 to 150 percent saturation or pickup (based on the dry weight of the fibrous material before impregnation).

In accordance with this invention it is advantageous to subject the unified fibrous article to heat treatment for short periods of time at elevated temperatures, such as from about above 150° F. up to about 400° F., the time of heat treatment preferably decreasing with increasing temperatures. This heat treat is necessary to insure that the "blocked" polyisocyanate has become "unblocked" thereby enhancing the internal bond strength of the article. It will be appreciated that in some instances the unblocking reaction may occur at the drying temperatures used to prepare the unified fibrous articles.

The copolymer latices containing unreacted blocked polyisocyanate compounds of the invention, as well as the method for producing same, are further illustrated in the following examples and their application to unified paper backings. It is to be understood, however, that the invention has applications to various fibrous masses, webs, flexible and rigid sheeting, as well as other fibrous articles which are customarily internally bonded, including nonwoven textile fabrics made with fibers such as cotton, rayon, nylon, polyester and other natural and synthetic fibers. Accordingly, the examples are not to be contrued as a limitation of the invention but merely illustrative of specific embodiments. Unless otherwise noted, all references to parts or percentages in these examples refer to parts or percent by weight respectively.

EXAMPLE I

The following experiments were run in order to illustrate the preparation of the copolymer latices containing blocked isocyanates which result from a practice of this invention. In a series of experiments, a phenol blocked tri(TDI)trimethylolpropane isocyanate adduct, a cresol blocked TDI trimer, a phenol blocked methylene bis(4-phenyl isocyanate), and a phenol blocked tolylene diisocyanate (TDI) were compared with an isocyanate-free control. All of the foregoing were employed in a low temperature redox type polymerization reaction employing Coco Powder as the emulsifier in the recipe. The polymerization reaction progressed very rapidly and without difficulty.

An aqueous redox system consisting of 150 parts of water, an emulsifying agent (4 parts of a coconut fatty acid produced by Swift and known commercially as Coco Powder 536), a chelating agent (0.02 part of ethlenediaminetetraacetic acid), a ferrous salt initiator (.003 part of ferrous sulfate) a modifier (0.7 part tertiary dodecyl mercaptan), and a reducing agent (.02 part of sodium formaldehyde sulfoxylate) was placed in a reaction vessel along with 67 parts of butadiene, and 33 parts of acrylonitrile. A mixture of dispersing agents (0.3 part of a sodium salt of polymerized alkyl naphthalenesulfonic acid and 0.5 part of tetrasodium pyrophosphate) was added to the system with 0.1 part of diisopropyl benzene hydroperoxide. The reaction vessel was heated to 25° C. and agitated to form an emulsion. After 4.5 hours, i.e., after the polymerization reaction had reached approximately 99.1 percent conversion, the agitation was stopped and the unreacted monomers and some water were then removed by vacuum stripping. This recipe was subsequently modified prior to polymerization by the addition of 0.5 part of various blocked isocyanates in aqueous dispersions. It was observed that no appreciable floc was formed, either with the control or with the modified latex during polymerization or stripping and concentrating. As shown by the following data, the rate of conversion and the final conversion were not adversely affected by the addition of the blocked isocyanate.

TABLE 1.—POLYMERIZATION DATA FOR BUTADIENE-ACRYLONITRILE LATICES MODIFIED WITH 0.5 PART OF A BLOCKED ISOCYANATE

|  | Percent | | |
| --- | --- | --- | --- |
|  | Conversion (1 hour) | Conversion (3 hours) | Final conversion (4.5 hours) |
| Isocyanate-free control | 29 | 86 | 99.1 |
| Phenol blocked bis (¹)-(4-phenyl isocyanate) | 25 | 83 | 98.2 |
| Phenol blocked-tri(TDI)(²) trimethylolpropane adduct | 25 | 85 | 98.4 |
| Cresol blocked (TDI) trimer (³) | 19 | 81 | 97.8 |
| Phenol blocked (TDI): | | | |
| Dispersion | 22 | 83 | 97.6 |
| Powder | 22 | 85 | 98.2 |

(¹) Hylene MP—a product of Dupont Inc.
(²) Mondur S—a product of Mobay Chemical Co.
(³) Mondur SH—a product of Mobay Chemical Co.

EXAMPLE II

Sheets of creped masking tape base (Duracel 301M) were submerged in the modified latices prepared in Example I with the exception of those containing the phenol blocked (TDI). Each sheet was immersed to obtain complete saturation of the tape base with the latex. The impregnated sheets were then withdrawn from the latex and excess latex removed by passing the sheets through squeeze rolls maintained under light pressure. After squeeze rolling, the impregnated paper was dried at a temperature of about 220° F. for a period of about 5 minutes to produce a paper having a polymer-blocked isocyanate content of 80 percent on a dry basis of the weight of the untreated masking tape base. This paper was cured for about one minute at about 375° F. The paper sheets were then subjected to a series of tests to determine the tensile strength (both wet and dry), internal bond strength represented as delamination resistance, and elongation properties developed by the impregnation with the particular copolymer.

Internal bond tests: internal bond strength is determined by measurement of resistance to delamination of the polymer impregnated sheets. The test is identified as the Permacel Tape Corporation Ply Adhesion Test. Such tests were conducted by taking sample sheets and sealing heat sensitive adhesive cloth backed tape to the front and back surfaces of the sample. The sample was reduced to 1 inch by 8 inches in size and placed in the jaws of a tensile machine. By operation of the machine, the two outer pieces of cloth backed tape were pulled apart at the rate of 12 inches per minute and the splitting or delamination of the impregnated paper sheet took place. The force required to continue the failure of the sheet by splitting or delamination was measured on a tensile testing machine (a Thwing-Albert Tensile Machine with a recording device) and this measured force was reported as the internal bond strength of the saturated paper in ounces per inch of width of test sample.

Tests for tensile strength of the impregnated paper were conducted by taking 1 inch by 8 inch samples of the impregnated paper and placing the ends thereof in the jaws of a standard tensile testing machine. The tensile strength was recorded by stretching the paper at the rate of 12 inches per minute in the machine direction of the paper, and the pounds per inch of width at which the sample failed in tension were recorded as the tensile strength of the sample. In like manner, the percentage elongation was measured by recording the percentage of elongation which took place before failure of the sample, the elongation being measured in the machine direction (MD) and cross direction (CD) of the paper sheet.

In the following table, the results of the tests of the above properties of the impregnated paper sheets are recorded. The blocked polyisocyanates are identified by their commercial names.

TABLE 3.—POLYMERIZATION DATA FOR LATICES USING DIFFERNET EMULSIFIERS

| Run No | 1 | 2 | 3 | 4 | 5 | 6 | 7 | 8 | 9 |
|---|---|---|---|---|---|---|---|---|---|
| Butadiene | 67 | | | | | | | | |
| Acrylonitrile | 33 | | | | | | | | |
| Water | 150 | | | | | | | | |
| Emulsifier: | | | | | | | | | |
| A [1] | | 4 | | 4 | | 4 | | 4 | |
| B [2] | | | 4 | | 4 | | 4 | | |
| C [3] | | | | | 5 | | 5 | | 5 |
| Tertiary dodecyl mercaptan | 0.7 | | | | | | | | |
| Tetrasodium pyrophosphate | 0.2 | | | | | | | | |
| Emulsifier D [4] | | | | 0.5 | | 0.5 | | | 0.5 |
| Ethylenediaminetetraacetic acid | 0.02 | | | | | | | | |
| $K_2S_2O_8$ | 0.1 | | | | | | | | |
| Phenol blocked bis [5] (4-phenyl isocyanate) | | | | 0.5 | 0.5 | 0.5 | | | |
| Cresol blocked (TDI) trimer [6] | | | | | | | 0.5 | 0.5 | 0.5 |
| Percent Conversion at 3 hours | 65 | 27 | 63 | 56 | 18 | 62 | 8 | 4 | 29 |
| Percent Conversion at 5 hours | 89 | 58 | 86 | 83 | 37 | 85 | 13 | 5 | 60 |
| Percent Final Conversion | 100 | 100 | 100 | 88 | 71 | 100 | (Discarded) | | 93 |
| Total Hours | 9 | 20 | 9 | 9 | 20 | 9 | 20 | 20 | 20 |

[1] Coconut fatty acid soap—Coco Powder 536, product of Siwft & Co.
[2] Rosin soap—Dresinate 731, product of Hercules Powder Co.
[3] Non-ionic—Igepal CO 890, product of General Aniline and Film Corp.
[4] Sodium salt of tridecyl ether sulfate.
[5] Hylene MP—product of Dupont.
[6] Mondur SH—product of Mobay Chemical Co.

TABLE 2

| | Control | Mondur S | Mondur SH | Hylene MP |
|---|---|---|---|---|
| MD Tensile (lbs./inch) | 19.0 | 18.5 | 19.0 | 19.6 |
| MD Elongation (percent) | 32.5 | 32.5 | 35.0 | 37.5 |
| CD Elmendorf [1] | 109 | 104 | 99 | 96 |
| Delamination (oz./inch) | 64 (64) | 76 (72) | 85 (85) | 74 (74) |
| MD Wet Tensile (lbs./inch) | 8.7 | 13.1 | 15.0 | 16.5 |
| MD Wet Elongation (percent) | 15.0 | 30.0 | 30.0 | 17.5 |
| CD Finch Edge Tear [2] | 36.0 | 38.0 | 41.5 | 41.0 |

[1] TAPPI Standard Test—T414 m-42.
[2] TAPPI Standard Test—T470 m-54.
NOTE.—(The data in parentheses was obtained after aging the latex for 18 days.

Inspection of the above data shows that the modified latices of this invention provide impregnant compositions which produce substantially greater internal bond strength in the treated paper without adversely affecting its elongation and tear properties.

EXAMPLE III

Using an emulsion polymerization technique similar to that described in Example I, additional modified latices containing a butadieneacrylonitrile copolymer and a blocked isocyanate compound were prepared with different emulsifiers at a polymerization temperature of 50° C. As shown by the following table, the choice of emulsifier will often determine the rate and degree of conversion obtained in the presence of the blocked isocyanates.

EXAMPLE IV

Following the impregnation technique set forth in Example II, additional test samples of Duracel 301M tape were saturated with the control latex prepared in run 1 and the modified latices prepared in runs 4 and 5 of Example III (each modified latex contains 0.5% Hylene MP). Test results of the physical properties of the treated paper are as follows:

TABLE 4

| | Control | Coconut fatty acid soap | Rosin soap |
|---|---|---|---|
| MD Tensile (lbs./inch) | 18 | 19.5 | 19.2 |
| MD Elongation (percent) | 30 | 30 | 25 |
| CD Elmendorf | 104 | 91 | 88 |
| Delamination (oz./inch) | 72 | 75 | 90 |
| MD Wet Tensile (lbs./inch) | 9.2 | 14.6 | 14.6 |
| MD Wet Elongation (percent) | 25 | 30 | 28 |
| CD Edge Tear | 36 | 36.2 | 35 |

EXAMPLE V

In order to illustrate the effects of adding the blocked polyisocyanates to the monomeric mixture as a 40% aqueous dispersion, an additional modified latex was prepared with a redox system containing 67 parts butadiene and 33 parts of acrylonitrile, similar to that described in Example I with the exception that a rosin soap was used in place of the fatty acid soap emulsifier (Coco Powder 536). The modified latex recipe contained 0.5 part of a blocked polyisocyanate prior to polymerization, i.e., phenol blocked methylene bis(4-phenylisocyanate) designated as Hylene MP. The control latex was prepared without the blocked isocyanate.

Inspection of the modified latex directly after polymerization and after two weeks showed no sedimentation of the dispersed blocked polyisocyanate powder.

EXAMPLE VI

Following the procedure described in Example II sheets of tape were impregnated and cured with the control latex and the modified latex prepared in Example V.

Tests of these treated sheets gave the following physical properties:

TABLE 5

| | Control | Aqueous Dispersion |
|---|---|---|
| MD Tensile (lbs./inch) | 17 | 17.5 |
| MD Elongation (percent) | 22.5 | 25.0 |
| CD Elmendorf | 104 | 75 |
| Delamination (oz./inch) | 65 | 94 |
| MD Wet Tensile (lbs./inch) | 4.8 | 14.5 |
| MD Wet Elongation (percent) | 30 | 40.0 |
| CD Edge Tear | 35.2 | 37.8 |

EXAMPLE VII

This example illustrates the advantages obtained by post addition of blocked polyisocyanates to rubbery latices when such latices are used as impregnant compositions for paper or the like.

A 67:33 butadiene-acrylonitrile copolymer latex was prepared in a redox system similar to that described in Example I, with the exception that a rosin soap (Dresinate 731) was used as an emulsifier. One portion was taken as a control, and then 0.1, 0.5 or 5.0 parts of phenol blocked methylene bis (4-phenyl isocyanate) per 100 parts of latex were added to separate portions of the latex and used to impregnate sheets of creped masking tape base (Duracel 301M) as described in Example II.

The results of the physical tests of the treated tape are given in the table below:

TABLE 6

|  | Parts of Blocked Isocyanate (Hylene MP) Added to Latex | | | |
| --- | --- | --- | --- | --- |
|  | 0.0 | 0.1 | 0.5 | 5.0 |
| MD Tensile (lbs./inch) | 14.2 | 15.1 | 15.6 | 17.1 |
| MD Elongation (percent) | 28 | 30 | 28 | 27 |
| CD Elmendorf | 93 | 84 | 86 | 66 |
| Delamination (oz./inch) | 48 | 58 | 64 | 75 |
| MD Wet Tensile (lbs./inch) | 3.6 | 10.5 | 12.5 | 14.5 |
| MD Wet Elongation (percent) | 27 | 30 | 35 | 30 |
| CD Edge Tear | 25.7 | 32.0 | 30.7 | 28.9 |

It will be seen that the increases in delamination resistance and wet tensile are very substantial. Thus, an unsatisfactory type of saturant is transformed into a very acceptable one. Also, an important point to note is that these improvements are attained without serious damage to elongation and tear properties of the treated paper base.

EXAMPLE VIII

Using the emulsion polymerization technique described in Example I, a latex was prepared from a monomeric mixture of 50% by weight of butadiene and 50% by weight of styrene in a rosin soap system. One portion of this latex was taken as a control and another was mixed with 5.0 parts per 100 parts of latex solids of Hylene MP. The effect of this post addition on such latices is shown by the following data in which the test procedures and base paper of Example II were employed.

TABLE 7

|  | Control | 5.0 Parts of Hylene MP |
| --- | --- | --- |
| MD Tensile | 18.4 | 18.5 |
| MD Elongation | 20 | 20 |
| CD Elmendorf | 65 | 57 |
| Delamination Resistance | 53 | 62 |
| MD Wet Tensile | 5.2 | 12.7 |
| MD Wet Elongation | 23 | 25 |
| CD Edge Tear | 17.6 | 18.4 |

It will be understood that the foregoing specification and examples are merely illustrative of the invention and that many modifications and variations may be made without departing from the spirit and scope thereof and therefore the invention is not intended to be limited except as indicated by the appended claims.

What is claimed is:

1. A method for preparing a modified latex characterized by enhanced bonding properties for non-woven fibrous materials which comprises mixing in an aqueous medium containing at least one emulsifier, monomeric material comprising from about 20% to about 90% by weight of at least one aliphatic conjugated diene having from 4 to 10 carbon atoms and from about 10% to about 80% by weight of at least one monoolefinic monomer copolymerizable with the diene; adding to said aqueous medium up to about 20 parts per 100 parts by weight of monomeric material of a polyisocyanate compound whose isocyanate groups are insensitive to water, said groups being blocked by reaction with a compound having a functional group that contains an active hydrogen atom and that can be subsequently driven off with heat; and emulsion polymerizating said monomeric material in the aqueous medium in the presence of the polyisocyanate compound with a redox initiator system at a temperature up to about 70° C. whereby said polyisocyanate compound does not react with or inhibit the emulsion polymerization of said monomeric material and said polyisocyanate compound remains dispersed in said latex for prolonged periods.

2. The method of claim 1 in which said isocyanate groups are blocked by reaction with a phenolic compound.

3. The method of claim 1 in which the polyisocyanate compound is added to said aqueous medium in the form of an aqueous dispersion.

4. The method of claim 1 in which the polyisocyanate compound is added to said aqueous medium in the form of a solution.

5. The method of claim 1 in which the monomeric material contains from 40 to 90 percent by weight of butadiene and from 10 to 60 percent by weight of acrylonitrile.

References Cited

UNITED STATES PATENTS

| 2,776,295 | 1/1957 | Wicklatz et al. | |
| 2,897,167 | 7/1959 | Dreisbach et al. | |
| 3,238,010 | 3/1966 | Habib et al. | 8—115.6 |
| 3,269,860 | 8/1966 | Richardson et al. | 260—891 |
| 3,251,713 | 5/1966 | Crone | 260—29.7 |
| 3,300,431 | 1/1967 | Ueno et al. | 260—29.7 |

SAMUEL H. BLECH, Primary Examiner

W. J. BRIGGS, Sr., Assistant Examiner

U.S. Cl. X.R.

8—115.6; 117—155; 260—80.7, 82.1, 82.3, 83.5, 83.7